No. 851,220. PATENTED APR. 23, 1907.
J. BOWERS.
VALVE.
APPLICATION FILED APR. 28, 1906.

WITNESSES:

INVENTOR
James Bowers
BY
ATTORNEY

UNITED STATES PATENT OFFICE.

JAMES BOWERS, OF CALDWELL, NEW JERSEY.

VALVE.

No. 851,220.  Specification of Letters Patent.  Patented April 23, 1907.

Application filed April 28, 1906. Serial No. 314,185.

*To all whom it may concern:*

Be it known that I, JAMES BOWERS, a citizen of the United States, residing at Caldwell, in the county of Essex and State of New Jersey, have invented certain new and useful Improvements in Valves; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a valve that is arranged to provide a common outlet for two inlets, the valve having a stem that reciprocates so that when one inlet is shut off from the outlet, the other one is opened and vice versa.

Another feature of the invention is that the valve is normally held to close one of the inlets by means of springs on the outside of the valve, and a saddle or yoke on the top of the valve stem is connected to the springs to hold the valve in this normal position.

Another feature is the construction of valve that provides for easy assembling. One of the features that makes this possible, being a valve stem that is separable longitudinally, the separable part embodying the valves that contact with the seats.

Figure 1:
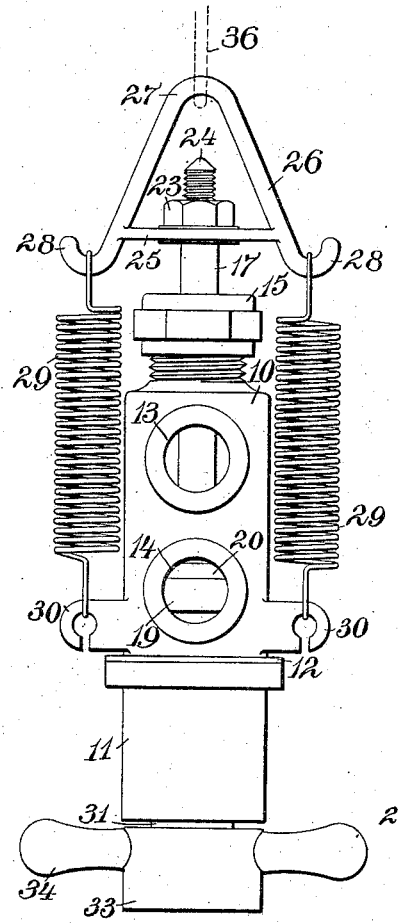
Figure 3:
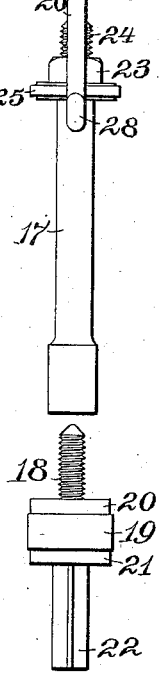
Figure 2:
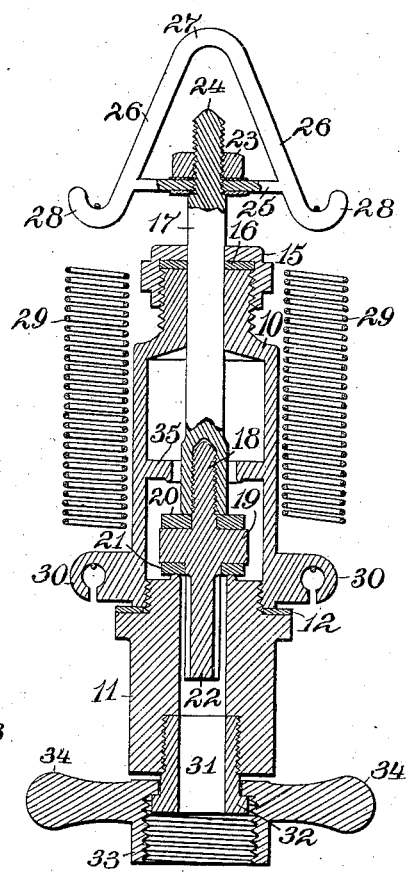

The invention is illustrated in the accompanying drawings, in which Figure 1 is a side view of the valve, and Fig. 2 is a longitudinal section. Fig. 3 is a side view of the valve stem with its elements separated, this view being taken at right angles to Fig. 1.

In the drawings, 10 is the upper member of the valve casing, and 11 is the lower member, this lower member providing a longitudinal opening for one of the inlets of the valve, and the two members screwing together, the gasket 12 making a tight joint.

In the upper member 10, is an opening 13 providing another inlet, and the opening 14 which furnishes an outlet for the two inlets. On the top of the casing 10 is screwed a nut 15 that provides a stuffing box, and the packing or washing 16 makes a tight joint for the reciprocation of the valve stem 17. The valve stem 17, at its lower end, receives the screw-threaded portion 18 of the valve 19, the valve being flanked by the washers 20 and 21, the washer 20 engaging the partition 35, and the washer 21 engaging the seat on the member 11. The lower end of this valve is arranged, as at 22, having a winged member to provide space for the fluid, and at the same time acting as a guide.

On the top of the stem 17 is the nut 23 screwed down on the screw-threaded portion 24, the nut engaging the horizontal portion 25 of the yoke or saddle, this saddle having the inclined arms 26 looped at the top, as at 27, and provided at both ends with the hooks 28. On these hooks are caught one end of the springs 29, the other end of the springs engaging the lugs 30 that are integral with the casing 10, near its juncture with the member 11.

For ready attachment to a pipe, I arrange a thimble 31 in the bottom of the member 11, this thimble having a flange 32 and the member 33 is fitted over it being operated by the projections 34. The member 33 is screw-threaded and can be turned onto the pipe to which the valve is to be attached.

In operation, the springs 29 normally hold the valve shut against the inlet in the member 11, but when pulled up by means of a cord or wire 36 in the loop of the saddle, the valve engages the seat in the partition 35, and the inlet 13 is shut off, and the inlet in the member 11 is opened. During this operation, the outlet 14 is always open.

The construction of the valve stem, herein described, makes the assembling of the valve easy, and allows a ready substitution of the washers 20 and 21 when this becomes necessary. The arrangement of the springs, and the peculiar construction of saddle, also forms a cheap construction, and one that is easily dismantled.

Having thus described my invention, what I claim is:—

1. A valve comprising a casing formed of two members, a partition in the upper member, the partition having a central perforation, a valve stem reciprocating in the members and having a valve between the lower member and said partition in the upper member, a saddle on the top of the stem having a central loop for operation, and hooks on opposed sides, lugs on opposed sides of the upper member of the casing, and springs stretched between the hooks and the lugs, the upper member of the casing having an inlet opening above the partition, and an outlet opening between the partition and the lower member.

2. A valve comprising a valve casing consisting of two members, a partition in the upper member, the lower member having a longitudinal inlet opening, and the upper member having an inlet opening above the partition, and an outlet opening below the partition, a valve stem reciprocating in the members and being separable between the partition and the lower member, a valve on the separable portion of the stem, a saddle on the top of the valve stem having a loop on the top for operation and having hooks on opposed sides, and springs on the outside of the casing attached to the saddle and the casing.

3. In a valve of the kind described, a valve stem having a valve separably attached to its lower portion, a washer arranged on either side of the valve, wings extending below the valve, and a saddle arranged on the top of the valve having means for attachment to a valve casing, and a loop in the top of the saddle for operation.

4. In a valve of the kind described, a saddle having a horizontal portion attached to the stem, inclined members having a loop at the top and terminating below the horizontal portion in hooks.

In testimony, that I claim the foregoing, I have hereunto set my hand this 25th day of April 1906.

JAMES BOWERS.

Witnesses:
   E. A. PELL,
   RALPH LANCASTER.